(12) United States Patent
Ohtake et al.

(10) Patent No.: US 11,688,896 B2
(45) Date of Patent: Jun. 27, 2023

(54) CELL COUNT DETERMINATION DEVICE, CHARGER, BATTERY PACK, AND CHARGING SYSTEM

(71) Applicant: LAPIS Semiconductor Co., Ltd., Yokohama (JP)

(72) Inventors: Hisao Ohtake, Yokohama (JP); Koji Suzuki, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 203 days.

(21) Appl. No.: 17/077,470

(22) Filed: Oct. 22, 2020

(65) Prior Publication Data

US 2021/0119278 A1 Apr. 22, 2021

(30) Foreign Application Priority Data

Oct. 22, 2019 (JP) ................................. 2019-192352

(51) Int. Cl.
*H01M 10/48* (2006.01)
*H02J 7/00* (2006.01)
*H01M 10/42* (2006.01)

(52) U.S. Cl.
CPC ....... *H01M 10/482* (2013.01); *H01M 10/425* (2013.01); *H02J 7/007188* (2020.01); *H01M 2010/4271* (2013.01)

(58) Field of Classification Search
CPC ............. H01M 10/425; H01M 10/441; H01M 10/482; H01M 2010/4271; H02J 7/0016; H02J 7/0048; H02J 7/007188; Y02E 60/10
See application file for complete search history.

(56) References Cited

U.S. PATENT DOCUMENTS 10,573,935 B2 * 2/2020 Muenzel ............... H02J 7/0048

FOREIGN PATENT DOCUMENTS

JP 2010-233359 A 10/2010

* cited by examiner

*Primary Examiner* — Victoria H Lynch
(74) *Attorney, Agent, or Firm* — Rabin & Berdo, P.C.

(57) ABSTRACT

A cell count determination device is configured to determine a cell count of a battery pack having installed therein a plurality of battery cells. The cell count determination device includes a plurality of switch elements provided in association with the plurality of battery cells, which can be increased or decreased in number in the battery pack. Each of the switch elements is configured to enter a conductive state if, while connected to the battery pack, a corresponding battery cell is present, and enter a non-conductive state if the corresponding battery cell is not present. The cell count determination device further includes a determination unit that is configured to determine the cell count of the connected battery pack on the basis of a combination of conductive states and non-conductive states among the plurality of switch elements.

6 Claims, 15 Drawing Sheets

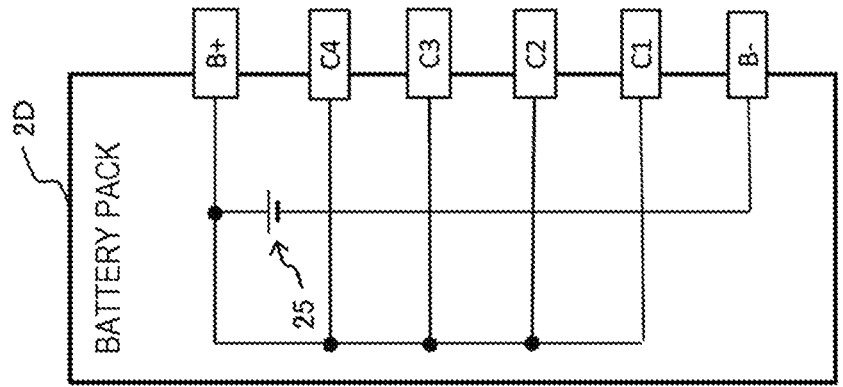
FIG. 2A  FIG. 2B  FIG. 2C  FIG. 2D
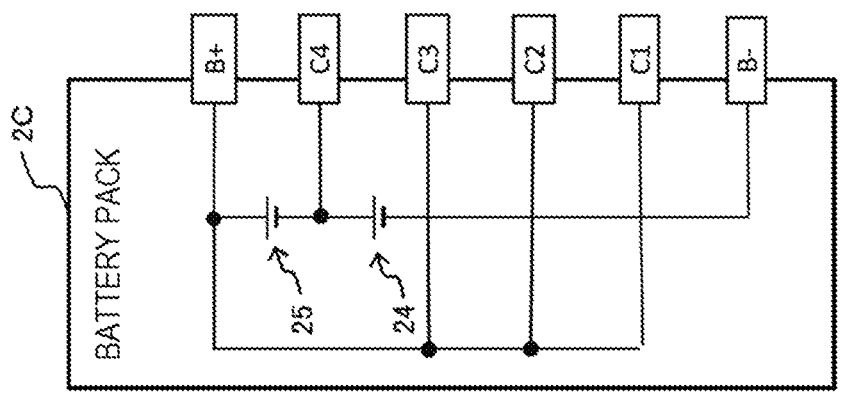
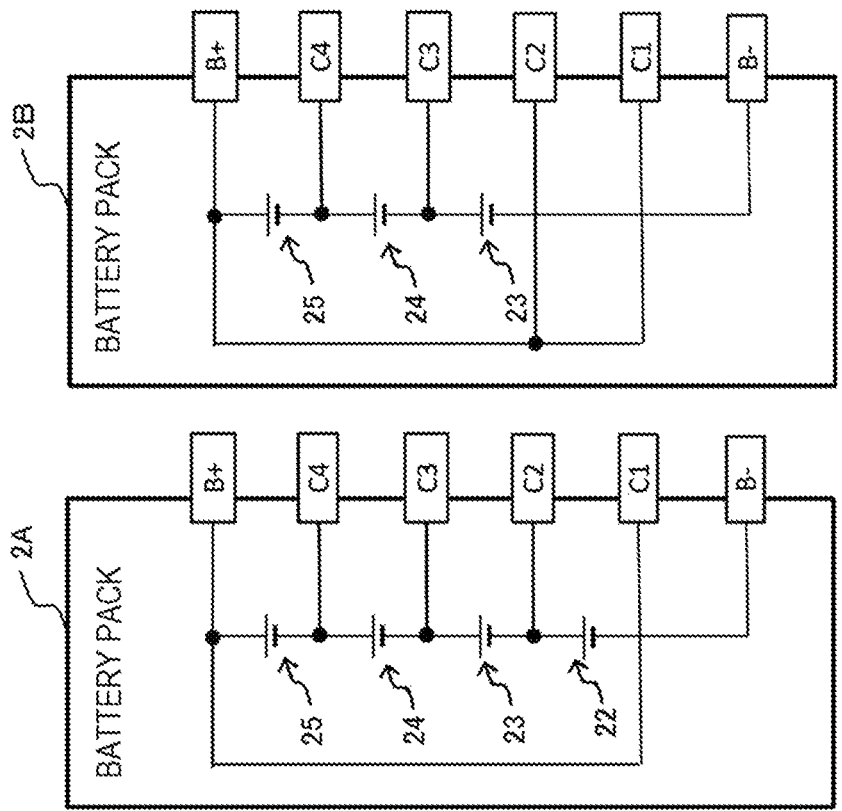

| BATTERY PACK | S1 | S2 |
|---|---|---|
| 3 CELLS | L | L |
| 4 CELLS | L | H |
| 5 CELLS | H | H |

FIG. 8

| BATTERY PACK | S1 | S2 | S3 | S4 |
|---|---|---|---|---|
| 1 CELL | L | L | L | L |
| 2 CELLS | L | L | L | H |
| 3 CELLS | L | L | H | H |
| 4 CELLS | L | H | H | H |
| 5 CELLS | H | H | H | H |

| BATTERY PACK | S1 | S2 |
|---|---|---|
| 3 CELLS | H | H |
| 4 CELLS | H | L |
| 5 CELLS | L | L |

CELL COUNT DETERMINATION DEVICE, CHARGER, BATTERY PACK, AND CHARGING SYSTEM

CROSS REFERENCE TO RELATED APPLICATIONS

This application is based upon and claims the benefit of priority of the prior Japanese Patent Application No. 2019-192352, filed on Oct. 22, 2019, the entire contents of which are incorporated herein by reference.

TECHNICAL FIELD

The present invention relates to a cell count determination device, a charger, a battery pack, and a charging system.

BACKGROUND ART

Japanese Patent Application Laid-Open Publication No. 2010-233359 discloses a cell count determination device that includes: a voltage measurement unit that selects an ith cell (i being an integer from 1 to N, N being a natural number) from among N cells connected in series to form one battery, and measures the voltage between a ground potential and a terminal of the cell that is connected to an (i−1)th cell, which is one level higher; a voltage comparison unit that compares the voltage of an (i+1)th cell, which is one level lower than the ith cell measured by the voltage measurement unit to the voltage of the ith cell measured by the voltage measurement unit, and determines the presence or absence of the ith cell or whether the cell is in normal operation; and a cell count determination unit that, on the basis of the comparison results of the voltage comparison unit, determines the number of cells installed, the number of cells in normal operation, or the positions where the cells are installed in the entire battery.

SUMMARY OF THE INVENTION

Problems to be Solved by the Invention

An object of the present invention is to provide a cell count determination device, a charger, a battery pack, and a charging system by which further device miniaturization is possible as compared to a case in which the cell count is determined on the basis of comparison results by a voltage comparison unit that compares the voltages of adjacent cells measured by a voltage measurement unit.

Means for Solving the Problems

A cell count determination device according to the present invention is a cell count determination device that is configured to determine a cell count of a battery pack having installed therein a plurality of battery cells, the cell count determination device including a plurality of switch elements provided in association with the plurality of battery cells. The battery cells can increase or decrease in number as the cell count of the battery cells changes; that is, a number of the battery cells in the battery pack is variable. Each of the switch elements is configured to enter a conductive state if, while connected to the battery pack, a corresponding battery cell is present, and enter a non-conductive state if the corresponding battery cell is not present. The cell count determination device further includes a determination unit that is configured to determine the cell count of the connected battery pack on the basis of a combination of conductive states and non-conductive states among the plurality of switch elements.

Effects of the Invention

According to the present invention, it is possible to attain further device miniaturization as compared to a case in which the cell count is determined on the basis of comparison results by a voltage comparison unit that compares the voltages of adjacent cells measured by a voltage measurement unit.

BRIEF DESCRIPTION OF THE DRAWINGS

FIGS. 2A to 2D show examples of configurations of battery packs having differing cell counts.

FIG. 8 shows one example of a cell count determination table used in the modification example.

DETAILED DESCRIPTION OF EMBODIMENTS

Embodiments of the present invention will be described in detail below with reference to the drawings.

Embodiment 1

(Charging System)

Figure 1:
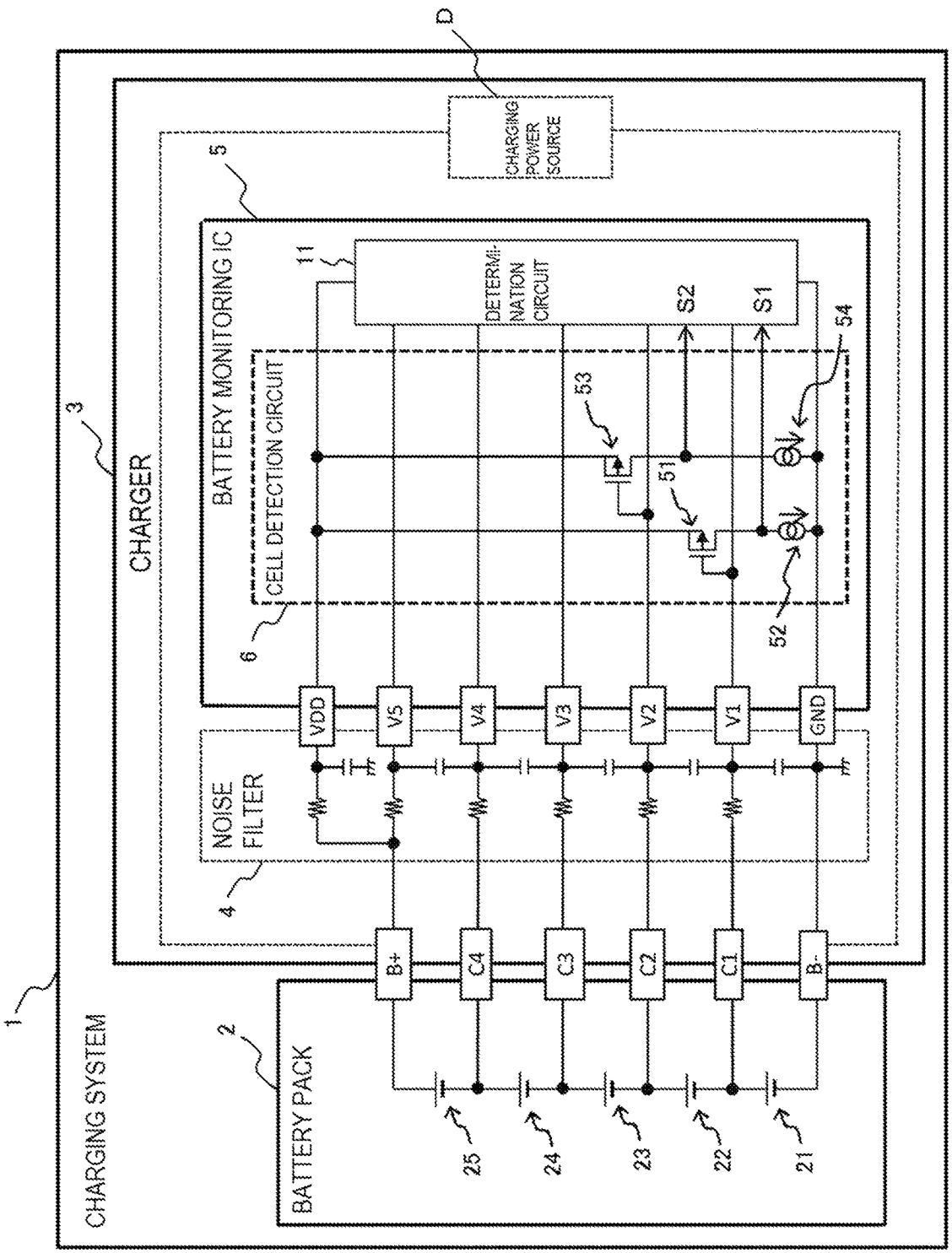
FIG. 1 is a block diagram showing an example of a configuration of a charging system according to Embodiment 1 of the present invention.

FIG. 1 is a block diagram showing an example of a configuration of a charging system according to Embodiment 1 of the present invention. A charging system 1 includes a battery pack 2 and a charger 3. The battery pack 2 includes a plurality of battery cells connected to each other in series. FIG. 1 shows an example in which a battery pack with five cells is connected to the charger 3. The charger 3 charges each of the plurality of battery cells in the battery pack 2.

In the charging system 1 of the present embodiment, it is possible to use a plurality of battery packs 2 with differing cell counts: five, four, or three cells. The maximum cell count is five cells. The charger 3 determines the cell count of the connected battery pack 2 and performs charging control according to the determined cell count. Below, the configuration of the battery pack 2 and the charger 3 will be explained in detail.

(Battery Pack)

Here, a configuration of the battery pack will be explained. In the example shown in FIG. 1, the battery pack 2 has five battery cells 21, 22, 23, 24, and 25, and six connection terminals B−, C1, C2, C3, C4, and B+ that connect the battery pack 2 to the charger 3. The connection terminal B− is referred to as the "lowest-level terminal B−." The connection terminal B+ is referred to as the "highest-level terminal B+." The connection terminals C1 to C4 are referred to as "intermediate terminals C1 to C4." If there is no need to differentiate between the highest-level terminal, the lowest-level terminal, and the intermediate terminals, then the connection terminals are referred to as the "connection terminal B−," the "connection terminals C1 to C4," the "connection terminal B+," or the like.

The lowest-level terminal B− is connected to a lowest-potential unit having the lowest potential in the battery pack 2. The highest-level terminal B+ is connected to a highest-potential unit having the highest potential in the battery pack 2. The intermediate terminals C1 to C4 correspond to intermediate connection points between the battery cells connected in series.

FIGS. 2A to 2D show examples of configurations of battery packs having differing cell counts. If the cell count is five, the intermediate terminals C1 to C4 are connected, respectively, to the intermediate connection points between the battery cells. As the cell count decreases, the number of intermediate connection points also decreases, and there are excess intermediate terminals that are not connected to an intermediate connection point. The intermediate connection points between the battery cells are connected to higher-level intermediate terminals in the battery pack, and the lower-level intermediate terminals are left remaining. In the present embodiment, the remaining intermediate terminals are connected to the highest-level terminal B+.

Figure 5:
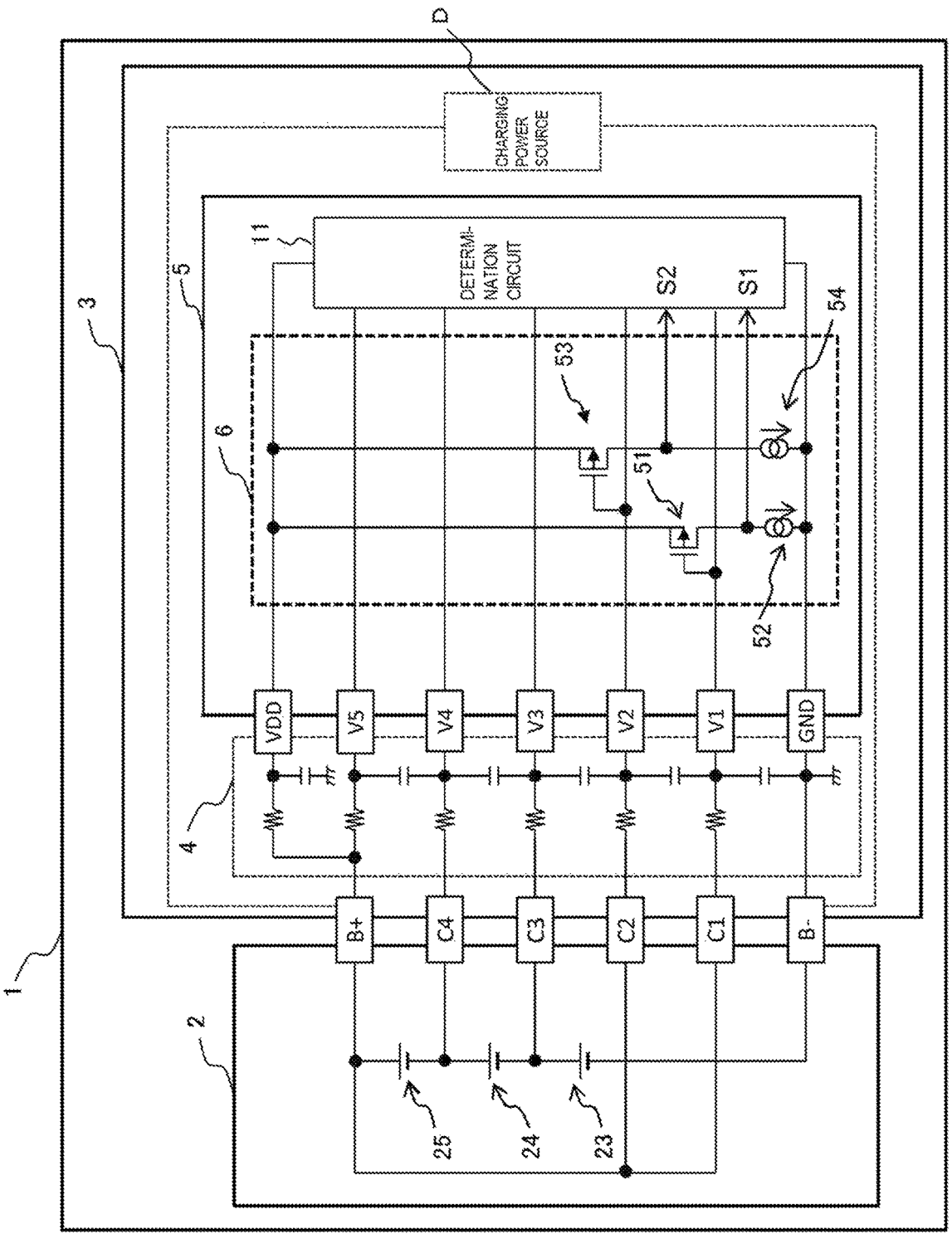
FIG. 5 is a block diagram showing an example in which a battery pack with three cells is connected to a charger.

As shown in FIG. 2A, if the cell count is four, then the battery cell 22 is the lowest-level cell, and the lower electrode thereof is connected to the lowest-level terminal B−. The remaining intermediate terminal C1 is connected to the highest-level terminal B+. As shown in FIG. 2B, if the cell count is three, then the battery cell 23 is the lowest-level cell, and the lower electrode thereof is connected to the lowest-level terminal B−. The remaining intermediate terminals C1 and C2 are connected to the highest-level terminal B+. FIG. 5 is a block diagram showing an example in which a battery pack with three cells is connected to a charger. FIGS. 2C and 2D will be described later.

(Charger)

The charger 3 includes a noise filter 4 that eliminates high frequency noise, a battery monitoring IC 5 that monitors the battery cells for excess charging as well as the temperature of the battery cells and the like, seven connection terminals GND, V1, V2, V3, V4, V5, and VDD that connect the noise filter 4 to the battery monitoring IC 5, and a charging power source D. The connection terminal GND is referred to as the "ground terminal GND." The connection terminal VDD is referred to as the "power source terminal VDD." The connection terminals V1 to V5 are referred to as "intermediate terminals V1 to V5."

If there is no need to differentiate the ground terminal, the power source terminal, and the intermediate terminals, then the connection terminals are referred to as the "connection terminal GND," the "connection terminals V1 to V5," the "connection terminal VDD," or the like. Also, the potentials of the connection terminals GND, V1 to V5, and VDD are $V_{GND}$, $V_1$ to $V_5$, and $V_{DD}$.

The ground terminal GND is the ground terminal of the battery monitoring IC 5. The power source terminal VDD is the power source terminal of the battery monitoring IC 5. If the battery pack is connected to the charger, then as shown, the ground terminal GND is connected to the lowest-level terminal B− of the battery pack 2. The power source terminal VDD and the intermediate terminal V5 are connected to the highest-level terminal B+ of the battery pack 2. Also, the intermediate terminals V1 to V4 are connected to the intermediate terminals C1 to C4 of the battery pack 2.

The noise filter 4 is constituted of resistors and capacitors. The battery monitoring IC 5 includes a cell detection circuit 6 that detects the battery cells and a determination circuit 11 that determines the cell count of the battery pack. The cell detection circuit 6 includes p-type metal oxide semiconductor (PMOS) transistors 51 and 53 as switch elements and fixed current sources 52 and 54. Below, the PMOS transistors are referred to as "PMOS."

Figures 3, 4:
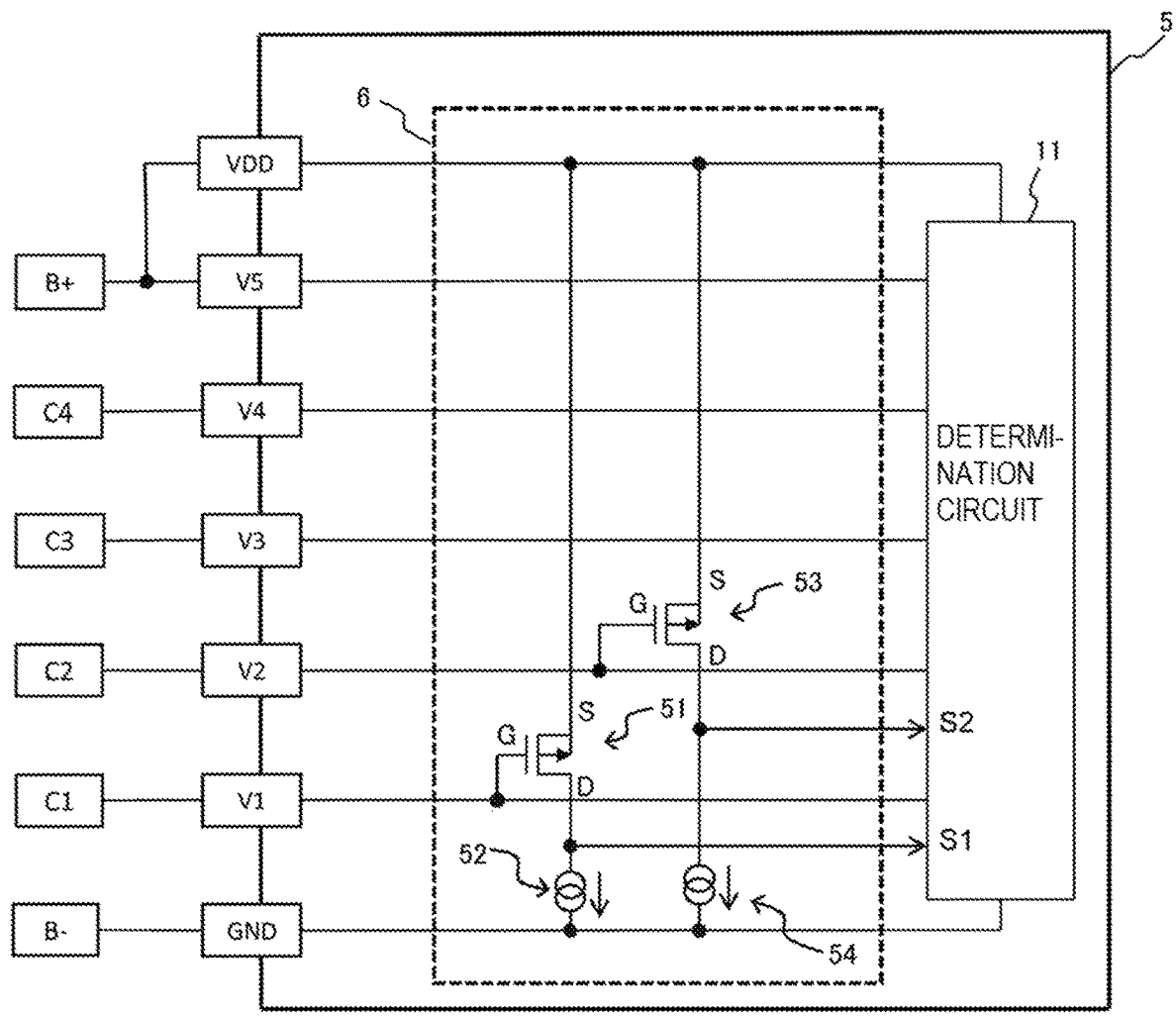
FIG. 3 is an enlarged view of a battery monitoring IC shown in FIG. 1.
FIG. 4 shows one example of a cell count determination table used in Embodiment 1.

FIG. 3 is an enlarged view of a battery monitoring IC 5 shown in FIG. 1. As shown in FIG. 3, the source of the PMOS 51 is connected to the power source terminal VDD, the gate is connected to the bottommost intermediate terminal V1, and the drain is connected to the first end of the fixed current source 52. The second end of the fixed current source 52 is connected to the GND.

The source of the PMOS 53 is connected to the power source terminal VDD, the gate is connected to the second intermediate terminal V2 from the bottom, and the drain is connected to the first end of the fixed current source 54. The second end of the fixed current source 54 is connected to the GND.

An output S1 from the cell detection circuit 6 is the voltage of the connection point between the drain of the PMOS 51 and the fixed current source 52. An output S2 from the cell detection circuit 6 is the voltage of the connection point between the drain of the PMOS 53 and the fixed current source 54.

The determination circuit 11 converts the outputs S1 and S2 of the cell detection circuit 6 to an H level or an L level. If the output value is greater than or equal to a predetermined threshold, then the output is set to the "H level," and if the output value is less than the predetermined threshold, then the output is set to the "L level." Where an intermediate potential between $V_{GND}$ and $V_{DD}$ is set to be a threshold $V_S$ ($0 \approx V_{GND} < V_S < V_{DD}$), an output value $V_{GND}$ is at the "L level" and the output value $V_{DD}$ is at the "H level."

Also, the determination circuit 11 uses a cell count determination table (see FIG. 4) (to be described below) to determine the cell count of the battery pack 2 according to the values of the outputs S1 and S2 from the cell detection circuit 6.

(Cell Count Determination Table)

Here, the cell count determination table will be described.

FIG. 4 shows one example of the cell count determination table used in Embodiment 1. The cell count determination table defines the relationship between the cell count of the battery pack and the combination of the plurality of output values from the cell detection circuit. The cell count determination table is prepared according to the range within which the cell count can be varied. In the present embodiment, the maximum cell count is five, and the number of cells can be changed within a range of three to five.

The cell count determination table shown in FIG. 4 defines the relationship between the cell count of the battery pack and the combination of the values of the outputs S1 and S2. With reference to the cell count determination table shown in FIG. 4, it is determined that if the output S1 is H and the output S2 is H, then the cell count is five; if the output S1 is L and the output S2 is H, then the cell count is four; and if the output S1 is L and the output S2 is L, then the cell count is determined to be three.

(Operation of Battery Monitoring IC)

In FIGS. 1 and 5, the voltage of the highest-potential unit of the battery pack 2 is transmitted to the highest-level terminal B+, and is transmitted through the noise filter 4 to the intermediate terminal V5 and the power source terminal VDD. Also, the voltages of the intermediate connection points between the battery cells of the battery pack 2 are transmitted to the intermediate terminals C1 to C4, and are transmitted through the noise filter 4 to the intermediate terminals V1 to V4.

The noise filter 4 removes high frequency noise from the voltages transmitted to the connection terminals V1 to V5 and VDD, but the DC voltage is the same as the voltage transmitted to the connection terminals C1 to C4 and B+.

—Five-Cell Battery Pack—

First, a case in which a battery pack with five cells is connected will be described.

In FIG. 1, the intermediate terminal C1 is connected to the intermediate connection point between the battery cells 21 and 22. The voltage of the intermediate terminal C1 is transmitted to the intermediate terminal V1 and then transmitted to the gate of the PMOS 51. The voltage of the highest-level terminal B+ is transmitted to the power source terminal VDD and then transmitted to the source of the PMOS 51.

The gate-source voltage of the PMOS 51 becomes substantially equal to the total voltage ($V_{DD}$ to $V_1$) of the battery cells 22 to 25, and thus, the PMOS 51 turns ON. When the PMOS 51 turns ON, conduction is enabled between the source and the drain of the PMOS 51. As a result, the output S1 of the cell detection circuit 6 becomes substantially equal to the voltage $V_{DD}$ of the power source terminal VDD of the battery monitoring IC.

Similarly, the intermediate terminal C2 is connected to the intermediate connection point between the battery cells 22 and 23. The voltage of the intermediate terminal C2 is transmitted to the intermediate terminal V2 and then transmitted to the gate of the PMOS 53. The voltage of the highest-level terminal B+ is transmitted to the power source terminal VDD and then transmitted to the source of the PMOS 53.

The gate-source voltage of the PMOS 53 becomes substantially equal to the total voltage ($V_{DD}$ to $V_2$) of the battery cells 23 to 25, and thus, the PMOS 53 turns ON. When the PMOS 53 turns ON, conduction is enabled between the source and the drain of the PMOS 53. As a result, the output S2 of the cell detection circuit 6 becomes substantially equal to the voltage $V_{DD}$ of the power source terminal VDD of the battery monitoring IC.

—Three-Cell Battery Pack—

Next, a case in which a battery pack with three cells is connected will be described.

In FIG. 5, the intermediate terminal C1 is connected to the highest-level terminal B+. Thus, the gate-source voltage of the PMOS 51 becomes substantially zero ($V_{DD}-V_5 \approx 0$), and thus, the PMOS 51 turns OFF. When the PMOS 51 turns OFF, conduction is disabled between the source and the drain of the PMOS 51. As a result, the output S1 of the cell detection circuit 6 is brought down to $V_{GND}$ by the fixed current source 52, reaching approximately zero.

Similarly, the intermediate terminal C2 is connected to the highest-level terminal B+. Thus, the gate-source voltage of the PMOS 53 becomes substantially zero ($V_{DD}-V_5 \approx 0$), and thus, the PMOS 53 turns OFF. When the PMOS 53 turns OFF, conduction is disabled between the source and the drain of the PMOS 53. As a result, the output S2 of the cell detection circuit 6 is brought down to $V_{GND}$ by the fixed current source 54, reaching approximately zero.

—Cell Count Determination Table—

Next, an operation for determining the cell count of the battery pack when the cell count is unknown will be described.

In simple terms, the cell detection circuit 6 is provided with PMOSs corresponding to battery cells that increase or decrease as the number of battery cells changes, and each PMOS is turned ON when there is a corresponding battery cell, while being turned OFF if there is no corresponding battery cell.

The source of the PMOS is connected to the power source terminal VDD and the drain is connected to the ground terminal GND via the fixed current source. Thus, when the PMOS is ON, conduction is enabled between the source and drain, and the output of the cell detection circuit 6 reaches $V_{DD}$ (H level). When the PMOS is OFF, conduction is disabled between the source and drain, and the output of the cell detection circuit 6 reaches $V_{GND}$ (L level).

If the cell count can vary within a range of three to five, the battery cells that are included or not included depending on the number of battery cells are the two battery cells 21 and 22. In the present embodiment, the PMOS 51 corresponding to the battery cell 21 is provided and the PMOS 53 corresponding to the battery cell 22 is provided. If the battery cell 21 is present, then the PMOS 51 is ON and the output S1 reaches the H level. If the battery cell 22 is present, then the PMOS 53 is ON and the output S2 reaches the H level.

In other words, when the outputs S1 and S2 from the cell detection circuit 6 are both at the H level, then aside from the battery cells 23 to 25, the battery cells 21 and 22 are present, which means that the cell count is five. When the output S1 is at the L level and the output S2 is at the H level, then aside from the battery cells 23 to 25, the battery 22 is present, which means that the cell count is four. When the outputs S1 and S2 are both at the L level, then only the battery cells 23 to 25 are present, which means that the cell count is three.

Figure 6:
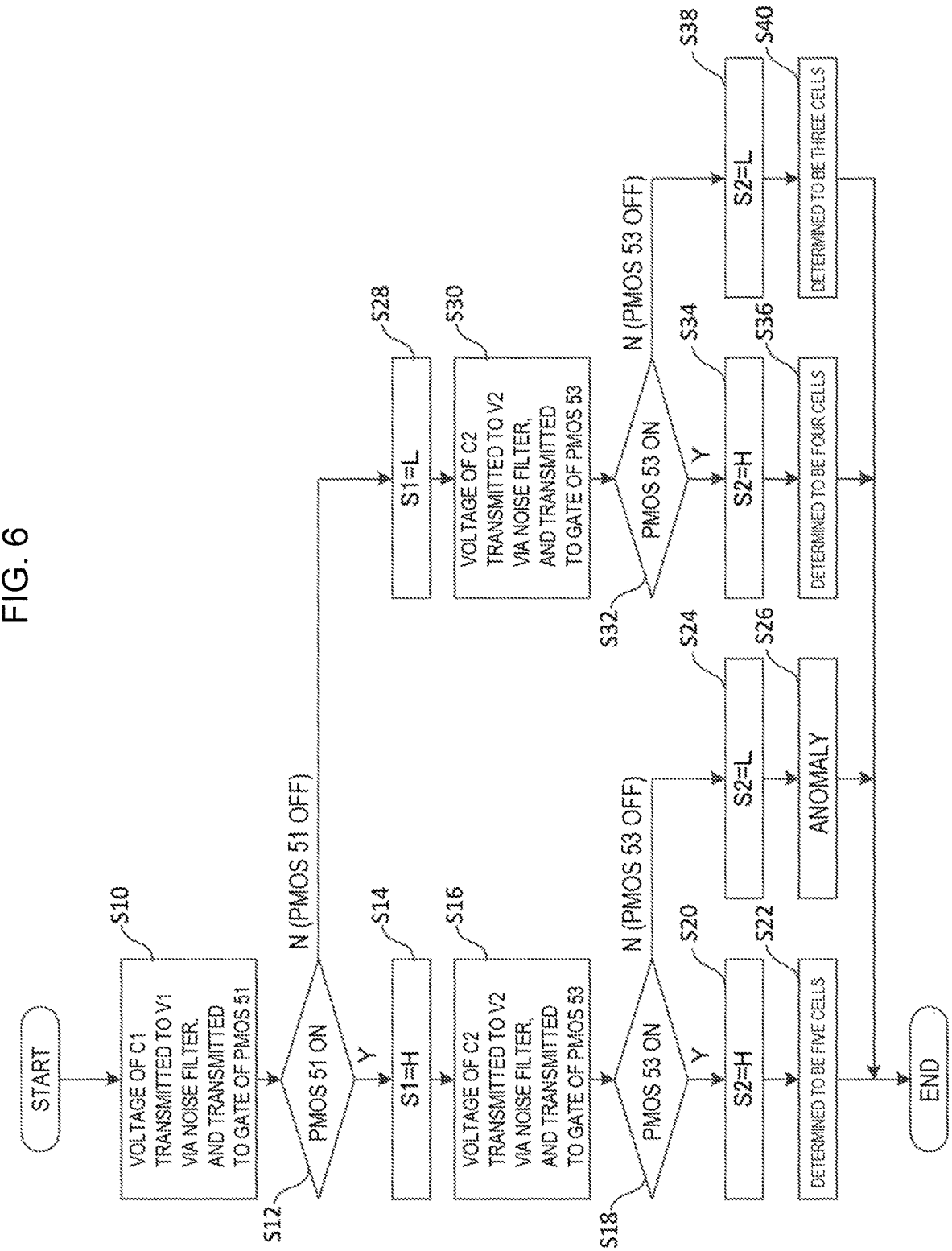
FIG. 6 is a flowchart showing an example of operations of the battery monitoring IC shown in FIGS. 1 and 5.

FIG. 6 is a flowchart showing an example of operations of the battery monitoring IC shown in FIGS. 1 and 5.

In step S10, the voltage of the intermediate terminal C1 is transmitted to the intermediate terminal V1 and then transmitted to the gate of the PMOS 51. The voltage of the highest-level terminal B+ is transmitted to the power source terminal VDD and then transmitted to the source of the PMOS 51.

In the next step S12, it is determined whether the PMOS 51 is ON. If the battery cell 21 corresponding to the intermediate terminal C1 is present, and the intermediate terminal C1 is connected to the intermediate connection point between the battery cells 21 and 22, then the PMOS 51 is ON. If the PMOS 51 is ON, then in the next step S14, the output 51 of the cell detection circuit 6 reaches the H level.

In the next step S16, the voltage of the intermediate terminal C2 is transmitted to the intermediate terminal V2 and then transmitted to the gate of the PMOS 53. The voltage of the highest-level terminal B+ is transmitted to the power source terminal VDD and then transmitted to the source of the PMOS 53.

In the next step 18, it is determined whether the PMOS 53 is ON. If the battery cell 22 corresponding to the intermediate terminal C2 is present, and the intermediate terminal C2 is connected to the intermediate connection point between the battery cells 22 and 23, then the PMOS 53 is ON.

If the PMOS 53 is ON, then in the next step S20, the output S2 of the cell detection circuit 6 reaches the H level. The outputs S1 and S2 are both at the H level, and thus, in the next step 22, the cell count determination table of FIG. 4 is used to determine the cell count of the battery pack to be five.

On the other hand, in step S18, if the battery cell 22 corresponding to the intermediate terminal C2 is not present, and the intermediate terminal C2 is connected to the highest-level terminal B+, then the PMOS 53 is OFF.

If the PMOS 53 is OFF, then in the next step 24, the output S2 of the cell detection circuit 6 reaches the L level. A combination of the output S1 being at the H level and the output S2 being at the L level is not present in the cell count determination table of FIG. 4, and thus, the cell count of the battery pack cannot be determined. Thus, in the next step 26, the cell count is determined to be "anomalous."

In step S12, if the battery cell 21 corresponding to the intermediate terminal C1 is not present, and the intermediate terminal C1 is connected to the highest-level terminal B+, then the PMOS 51 is OFF.

If the PMOS 51 is OFF, then in the next step S28, the output S1 of the cell detection circuit 6 reaches the L level. In the next step S30, the voltage of the intermediate terminal C2 is transmitted to the intermediate terminal V2 and then transmitted to the gate of the PMOS 53. The voltage of the highest-level terminal B+ is transmitted to the power source terminal VDD and then transmitted to the source of the PMOS 53.

In the next step S32, it is determined whether the PMOS 53 is ON. If the battery cell 22 corresponding to the intermediate terminal C2 is present, and the intermediate terminal C2 is connected to the intermediate connection point between the battery cells 22 and 23, then the PMOS 53 is ON.

If the PMOS 53 is ON, then in the next step S34, the output S2 of the cell detection circuit 6 reaches the H level. The output S1 is at the L level and the output S2 is at the H level, and thus, in the next step S36, the cell count determination table of FIG. 4 is used to determine the cell count of the battery pack to be four.

On the other hand, in step S32, if the battery cell 22 corresponding to the intermediate terminal C2 is not present, and the intermediate terminal C2 is connected to the highest-level terminal B+, then the PMOS 53 is OFF. If the PMOS 53 is OFF, then in the next step S38, the output S2 of the cell detection circuit 6 reaches the L level. The outputs S1 and S2 are both at the L level, and thus, in the next step 40, the cell count determination table of FIG. 4 is used to determine the cell count of the battery pack to be three.

Effects of Embodiment 1

A conventional cell count determination device would have included a voltage measurement unit that measures the potential of an intermediate connection point between battery cells, a voltage comparison unit that compares potentials measured by the voltage measurement unit to determine the presence or absence of cells and whether the cells are in normal operation, and a determination unit that determines the cell count on the basis of the comparison results by the voltage comparison unit.

By contrast, in Embodiment 1, the PMOSs 51 and 53 of the cell detection circuit are turned ON or OFF depending on the number of battery cells present in the battery pack connected to the charger, resulting in the outputs S1 and S2 of the cell detection circuit being at the H level or the L level, and thus, it is possible to determine the number of battery cells present in the battery pack according to the combination of operation levels of the outputs S1 and S2.

In other words, the voltage measurement unit and the voltage comparison unit are unnecessary, resulting in a simpler circuit configuration as compared to conventional cell count determination devices, enabling miniaturization of the device.

Modification Example of Determined Cell Count

Figure 7:
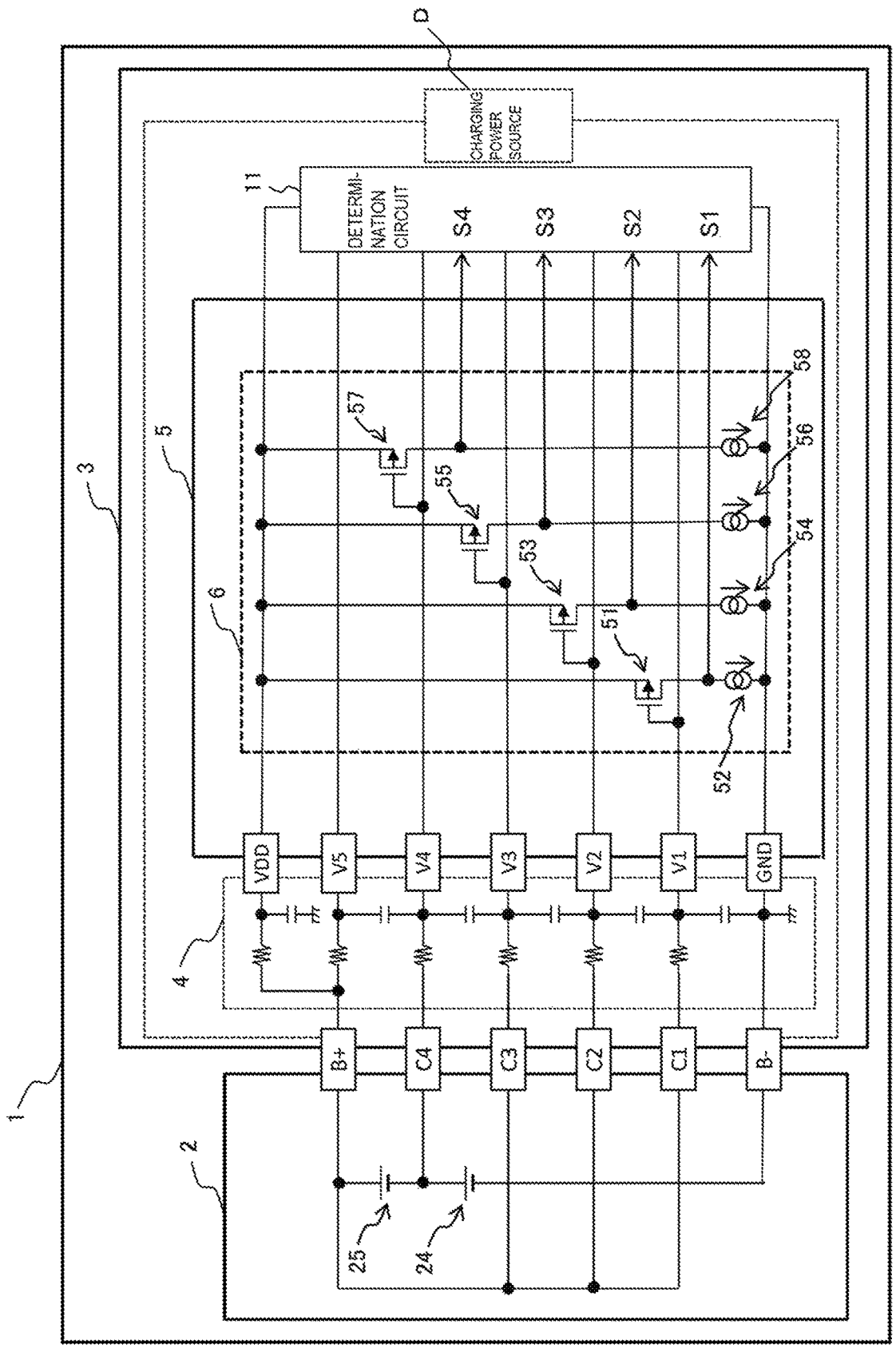
FIG. 7 is a block diagram showing a configuration of a charger according to a modification example of Embodiment 1.

In the present embodiment, an example was described in which the cell count can vary within a range of three to five. However, the range of cell counts is not limited thereto. FIG. 7 is a block diagram showing a configuration of a charger according to a modification example of Embodiment 1. In the modification example, the cell count can vary within a range of one to five. In this case, the battery cells that are included or not included depending on the number of battery cells are the four battery cells 21 to 24.

In FIGS. 2A and 2B, cases were described in which the battery pack 2 has four cells or three cells, but in the modification example, it is possible to similarly design battery packs 2 with one or two cells. As shown in FIG. 2C, if the cell count is two, then the battery cell 24 is the lowest-level cell, and the lower electrode thereof is connected to the lowest-level terminal B−. The remaining intermediate terminals C1 to C3 are connected to the highest-level terminal B+. As shown in FIG. 2D, if the cell count is one, then the battery cell 25 is the lowest-level cell, and the lower electrode thereof is connected to the lowest-level terminal B−. The remaining intermediate terminals C1 to C4 are connected to the highest-level terminal B+.

The cell detection circuit 6 of the battery monitoring IC 5 is provided with the PMOS 51 and the fixed current source 52 corresponding to the battery cell 21, the PMOS 53 and the fixed current source 54 corresponding to the battery cell 22, a PMOS 55 and a fixed current source 56 corresponding to the battery cell 23, and a PMOS 57 and a fixed current source 58 corresponding to the battery cell 24.

The cell detection circuit 6 has the outputs S3 and S4 in addition to the outputs 51 and S2. An output S3 from the cell detection circuit 6 is the voltage of the connection point between the drain of the PMOS 55 and the fixed current source 56. An output S4 from the cell detection circuit 6 is the voltage of the connection point between the drain of the PMOS 57 and the fixed current source 58. If the battery cell 23 is present, then the PMOS 55 is ON and the output S3 reaches the H level. If the battery cell 24 is present, then the PMOS 57 is ON and the output S4 reaches the H level.

FIG. 8 shows one example of a cell count determination table used in the modification example. The cell detection circuit 6 has outputs S1 to SN (N=4 in the illustrated example) corresponding to the number of battery cells, which can fluctuate in number. The determination circuit 11 stores the relationship between the cell count of the battery pack and the combination of the values of the outputs S1 to SN as the cell count determination table.

The determination circuit 11 uses the cell count determination table to determine the cell count of the battery pack. For example, when the outputs S1 to S4 from the cell detection circuit 6 are all at the H level, then the battery cells 21 to 25 are present, and the cell count is determined to be five. When the outputs S1 to S3 are at the L level and the output S4 is at the H level, then only the battery cells 24 and 25 are present, and the cell count is determined to be two.

Embodiment 2

(Charging System)

Figure 9:
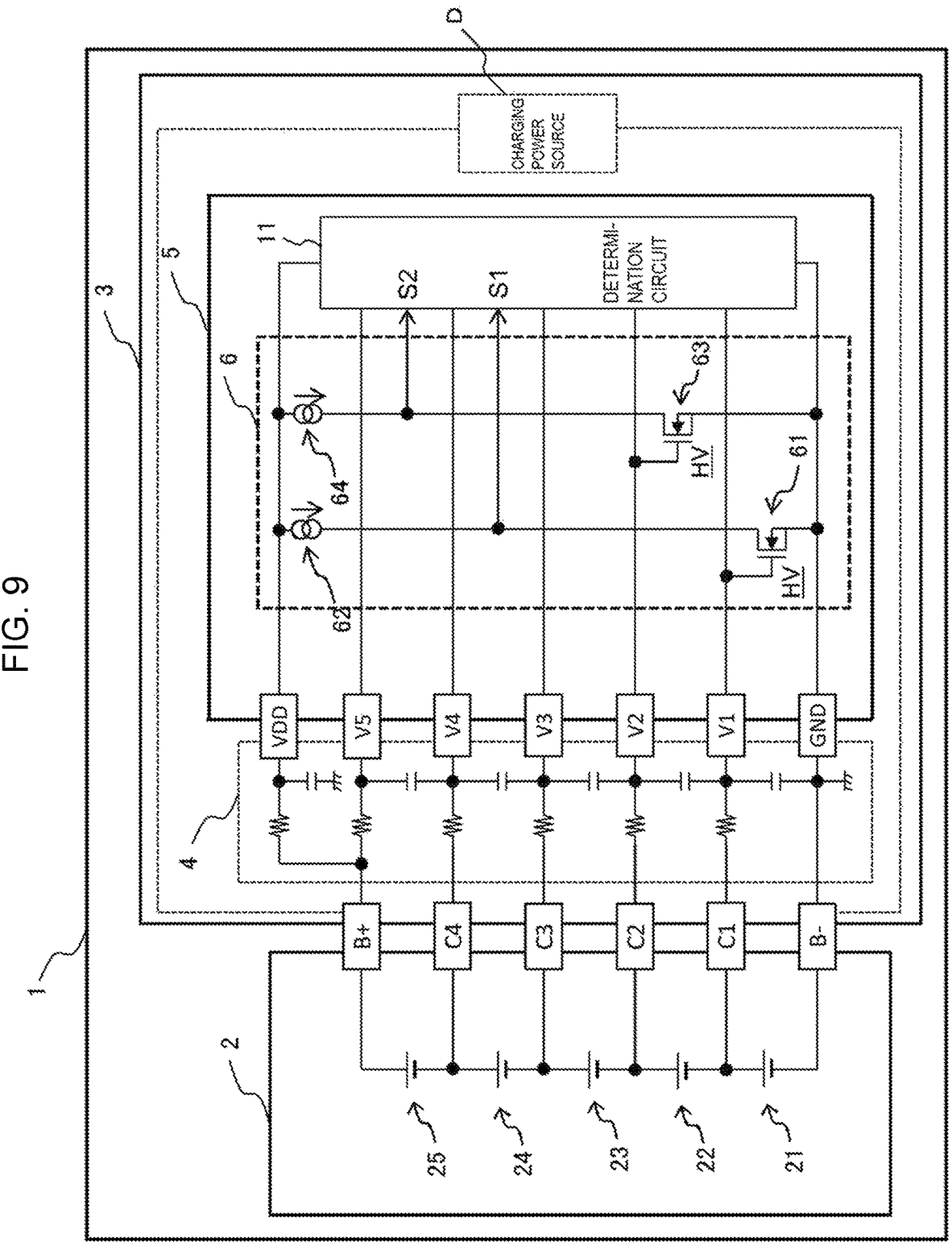
FIG. 9 is a block diagram showing an example of a configuration of a charging system according to Embodiment 2 of the present invention.

FIG. 9 is a block diagram showing an example of a configuration of a charging system according to Embodiment 2 of the present invention. A charging system of the present embodiment, similar to Embodiment 1, includes a battery pack 2 and a charger 3 that determines the cell count of the connected battery pack 2 and performs charging control according to the determined cell count. FIG. 9 shows an example in which a battery pack with five cells is connected to the charger 3. In Embodiment 2, the configuration of the battery pack 2 and the charger 3 differs from that of Embodiment 1. Below, the configuration of the battery pack 2 and the charger 3 will be explained.

(Battery Pack)

Similar to Embodiment 1, the battery pack 2 includes five battery cells 21 to 25 and six connection terminals (lowest-level terminal B−, highest-level terminal B+, and intermediate terminals C1 to C4).

In Embodiment 2, the remaining intermediate terminals are connected to the lowest-level terminal B−, which differs from the configuration of Embodiment 1 in which the remaining intermediate terminals are connected to the highest-level terminal B+. Other components are similar to those of the battery pack of Embodiment 1, and therefore, are assigned the same reference characters and descriptions thereof are omitted.

Figure 10:
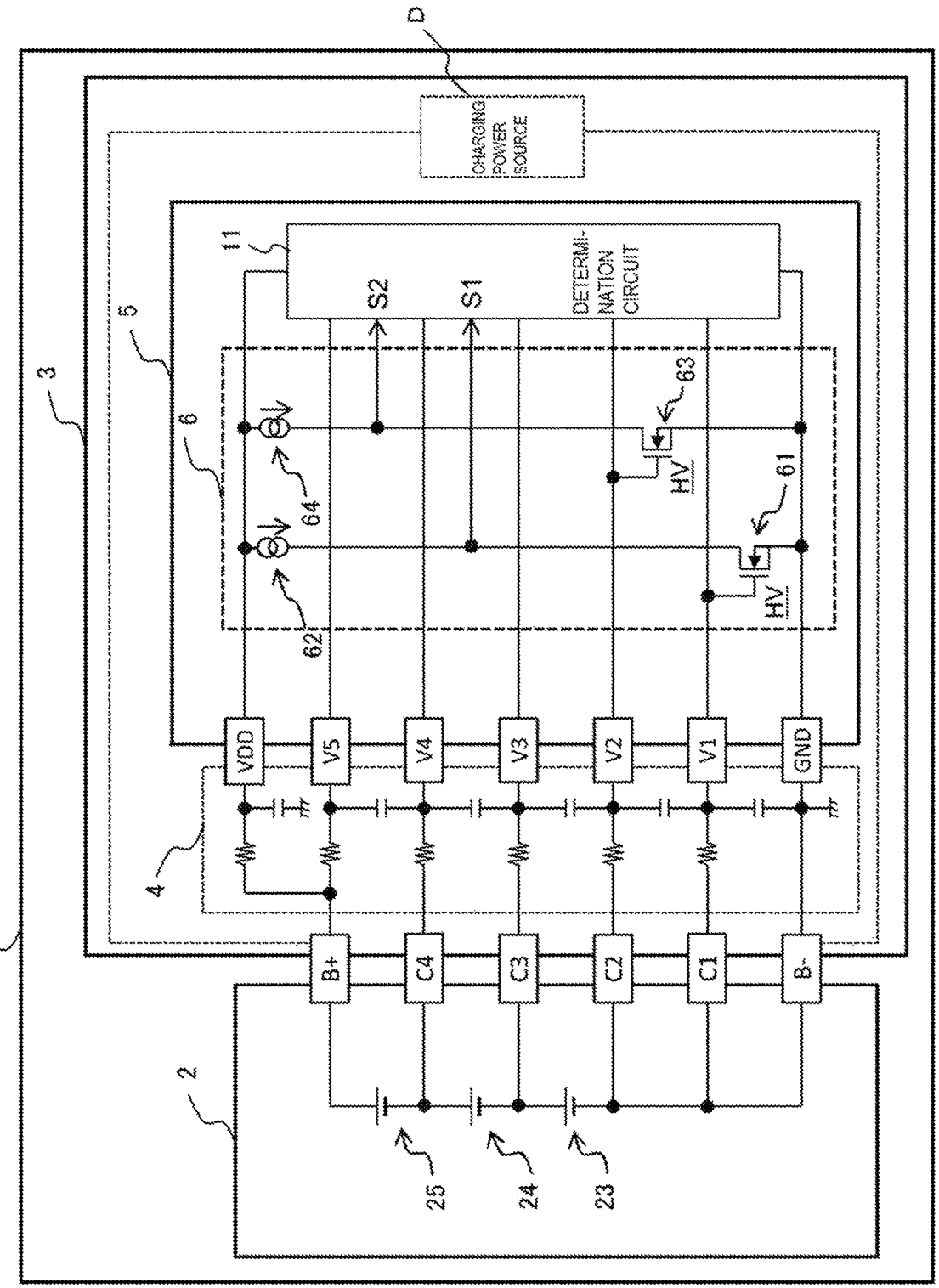
FIG. 10 is a block diagram showing an example in which a battery pack with three cells is connected to a charger.

FIG. 10 is a block diagram showing an example in which a battery pack with three cells is connected to a charger. As shown in FIG. 10, if the battery pack 2 has a cell count of three, then the battery cell 23 is the lowest-level cell, and the lower electrode thereof is connected to the lowest-level terminal B−. The remaining intermediate terminals C1 and C2 are connected to the lowest-level terminal B− of the battery pack 2.

(Charger)

Similar to Embodiment 1, the charger 3 includes a noise filter 4, a battery monitoring IC 5, seven connection terminals (ground terminal GND, power source terminal VDD, and intermediate terminals V1 to V5) that connect the noise filter 4 to the battery monitoring IC 5, and a charging power source D. The battery monitoring IC 5 includes a cell detection circuit 6 and a determination circuit 11.

In Embodiment 2, the configuration of the cell detection circuit 6 of the charger 3 differs from that of Embodiment 1 due to the difference in configuration of the battery pack 2. The cell detection circuit 6 of Embodiment 2 includes n-type metal oxide semiconductor (NMOS) transistors 61 and 63 for high voltage use (HV) as switch elements and fixed current sources 62 and 64. Below, the NMOS transistors are referred to as "NMOS."

Figures 11, 12:
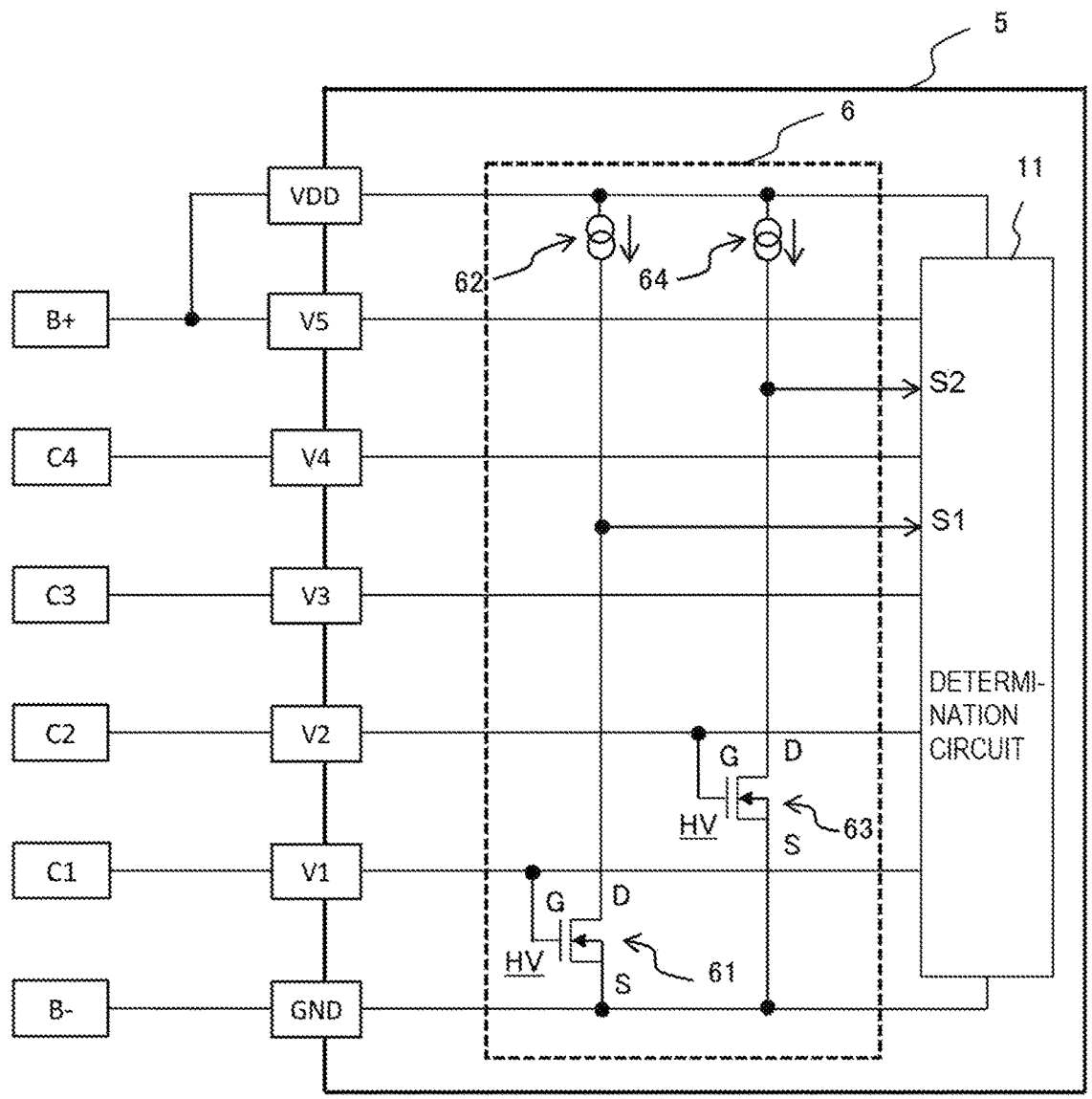
FIG. 11 is an enlarged view of a battery monitoring IC shown in FIG. 9.
FIG. 12 shows one example of a cell count determination table used in Embodiment 2.

FIG. 11 is an enlarged view of a battery monitoring IC 5 shown in FIG. 9. As shown in FIG. 11, the source of the NMOS 61 is connected to the ground terminal GND, the gate is connected to the bottommost intermediate terminal V1, and the drain is connected to the first end of the fixed current source 62. The second end of the fixed current source 62 is connected to the power source terminal VDD.

The source of the NMOS 63 is connected to the ground terminal GND, the gate is connected to the second from the bottom intermediate terminal V2, and the drain is connected to the first end of the fixed current source 64. The second end of the fixed current source 64 is connected to the power source terminal VDD.

An output S1 from the cell detection circuit 6 is the voltage of the connection point between the drain of the NMOS 61 and the fixed current source 62. An output S2 from the cell detection circuit 6 is the voltage of the connection point between the drain of the NMOS 63 and the fixed current source 64.

The determination circuit 11 converts the outputs S1 and S2 of the cell detection circuit 6 to an H level or an L level. The determination circuit 11 uses a cell count determination table (see FIG. 12) to be described below to determine the cell count of the battery pack 2 according to the values of the outputs S1 and S2 from the cell detection circuit 6.

(Cell Count Determination Table)

FIG. 12 shows one example of the cell count determination table used in Embodiment 2. The cell count determination table shown in FIG. 12 defines the relationship between the cell count of the battery pack and the combination of the values of the outputs S1 and S2. In the illustrated example, it is determined that if the output S1 is L and the output S2 is L, then the cell count is five; if the output S1 is H and the output S2 is L, then the cell count is four; and if the output S1 is H and the output S2 is H, then the cell count is three.

(Operation of Battery Monitoring IC)

—Five-Cell Battery Pack—

First, a case in which a battery pack with five cells is connected will be described.

In FIG. 9, the intermediate terminal C1 is connected to the intermediate connection point between the battery cells 21 and 22. The voltage of the intermediate terminal C1 is transmitted to the intermediate terminal V1 and then transmitted to the gate of the NMOS 61. The voltage of the lowest-level terminal B− is transmitted to the ground terminal GND and then transmitted to the source of the NMOS 61.

The gate-source voltage of the NMOS 61 becomes substantially equal to the voltage ($V_1$) of the battery cell 21, and thus, the NMOS 61 turns ON. When the NMOS 61 turns ON, conduction is enabled between the source and the drain of the NMOS 61. As a result, the output S1 of the cell detection circuit 6 becomes substantially equal to the voltage $V_{GND}$, which is substantially equal to 0, of the ground terminal GND of the battery monitoring IC.

Similarly, the intermediate terminal C2 is connected to the intermediate connection point between the battery cells 22 and 23. The voltage of the intermediate terminal C2 is transmitted to the intermediate terminal V2 and then transmitted to the gate of the NMOS 63. The voltage of the lowest-level terminal B− is transmitted to the ground terminal GND and then transmitted to the source of the NMOS 63.

The gate-source voltage of the NMOS 63 becomes substantially equal to the total voltage $(V_1+V_2)$ of the battery cells 21 and 22, and thus, the NMOS 63 turns ON. When the NMOS 63 turns ON, conduction is enabled between the source and the drain of the NMOS 63. As a result, the output S2 of the cell detection circuit becomes substantially equal to the voltage $V_{GND}$, which is substantially equal to 0, of the ground terminal GND of the battery monitoring IC.

—Three-Cell Battery Pack—

Next, a case in which a battery pack with three cells is connected will be described.

In FIG. 10, the intermediate terminal C1 is connected to the lowest-level terminal B−. Thus, the gate-source voltage of the NMOS 61 becomes substantially zero $(V_1 \approx V_{GND} \approx 0)$, and thus, the NMOS 61 turns OFF. When the NMOS 61 turns OFF, conduction is disabled between the source and the drain of the NMOS 61. As a result, the output S1 of the cell detection circuit 6 is brought up by the fixed current source 62, substantially reaching the voltage $V_{DD}$ of the power source terminal VDD.

Similarly, the intermediate terminal C2 is connected to the lowest-level terminal B−. Thus, the gate-source voltage of the NMOS 63 becomes substantially zero $(V_2 \approx V_{GND} \approx 0)$, and thus, the NMOS 63 turns OFF. When the NMOS 63 turns OFF, conduction is disabled between the source and the drain of the NMOS 63. As a result, the output S2 of the cell detection circuit 6 is brought up by the fixed current source 64, substantially reaching the voltage $V_{DD}$ of the power source terminal VDD.

—Cell Count Determination Table—

Next, an operation for determining the cell count of the battery pack when the cell count is unknown will be described.

In simple terms, the cell detection circuit of the battery monitoring IC, which determines the cell count of the battery pack, is provided with NMOSs corresponding to battery cells that increase or decrease as the number of battery cells changes, and each NMOS is turned ON when there is a corresponding battery cell while being turned OFF if there is no corresponding battery cell.

The source of the NMOS is connected to the ground terminal GND and the drain is connected to the power source terminal VDD via the fixed current source 62. Thus, when the NMOS is ON, conduction is enabled between the source and drain, and the output of the cell detection circuit 6 reaches $V_{GND}$ (L level). When the NMOS is OFF, conduction is disabled between the source and drain, and the output of the cell detection circuit 6 reaches $V_{DD}$ (H level).

If the cell count can vary within a range of three to five, the battery cells that are included or not included depending on the number of battery cells are the two battery cells 21 and 22. In the present embodiment, the NMOS 61 corresponding to the battery cell 21 is provided and the NMOS 63 corresponding to the battery cell 22 is provided. If the battery cell 21 is present, then the NMOS 61 is ON and the output S1 reaches the L level. If the battery cell 22 is present, then the NMOS 63 is ON and the output S2 reaches the L level.

In other words, when the outputs S1 and S2 from the cell detection circuit 6 are both at the L level, then aside from the battery cells 23 to 25, the battery cells 21 and 22 are present, and thus, the cell count is determined to be five. When the output S1 is at the H level and the output S2 is at the L level, then aside from the battery cells 23 to 25, the battery 22 is present, and thus, the cell count is determined to be four. When the outputs S1 and S2 are both at the H level, then only the battery cells 23 to 25 are present, and thus, the cell count is determined to be three.

Effects of Embodiment 2

In Embodiment 2, similarly to Embodiment 1, it is possible to determine the number of battery cells present in the battery pack according to the combination of operation levels of the outputs S1 and S2. In other words, the voltage measurement unit and the voltage comparison unit are unnecessary, resulting in a simpler circuit configuration as compared to conventional cell count determination devices, enabling miniaturization of the device.

Also, in Embodiment 2, the remaining intermediate terminals are connected to the lowest-level terminal B−, which allows for a simpler and more natural circuit configuration as compared to Embodiment 1 in which the remaining intermediate terminals are connected to the highest-level terminal B+.

Modification Example of Battery Monitoring IC

Figure 13:
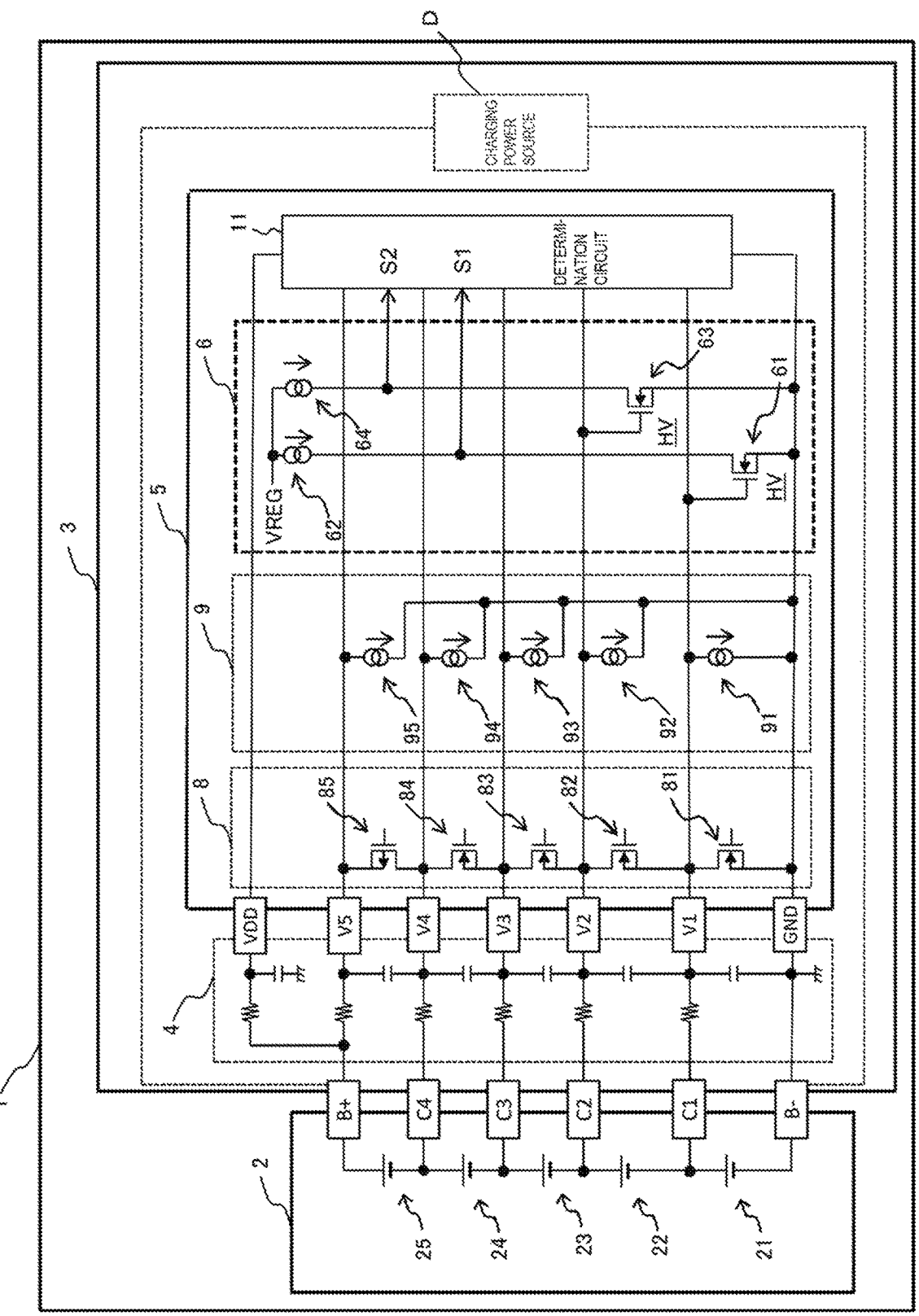
FIG. 13 is a block diagram showing an example of a configuration of a charging system according to a modification example of Embodiment 2.

FIG. 13 is a block diagram showing an example of a configuration of a charging system according to a modification example of Embodiment 2 of the present invention. The charging system according to the modification example differs from the configuration shown in FIG. 9 in that the battery monitoring IC 5 of the charger 3 additionally has a cell balance circuit 8 and a disconnection detection circuit 9. The configuration of the cell detection circuit 6 is similar to that of Embodiment 2.

The battery monitoring IC 5 of Embodiment 1 cannot have a cell balance circuit connected therein. This is because, if the battery pack has three cells, the intermediate terminal V2 is connected to the highest-level terminal B+, and thus, a current flows in a parasitic diode formed between a back gate and a drain of a cell balance switch 83, which prevents the cell balance function from being implemented.

The cell balance circuit 8 is a circuit provided with a function of eliminating variation in battery capacity among the battery cells. The cell balance circuit 8 is constituted of cell balance switches 81 to 85.

The cell balance switches 81 to 84 are NMOSs. The source and back gate of the NMOS 81 are connected to the ground terminal GND and the drain is connected to the connection terminal V1. The source and back gate of the NMOSs 82 to 84 are connected to a connection terminal $V_n$ and the drain is connected to a connection terminal $V_{n+1}$.

The cell balance switch 85 is a PMOS. The source and back gate of the PMOS 85 are connected to the connection terminal $V_5$ and the drain is connected to the connection terminal $V_4$.

The cell voltages of the battery cells 21 to 25 are monitored by the battery monitoring IC 5, and if the voltage of each cell exceeds a given value, then the corresponding cell balance switch is turned ON and the cell charge is discharged, thereby achieving the cell balance operation.

If, for example, the cell voltage of the battery cell 23 exceeds the given value, the cell balance switch 83 is turned on, causing the charge in the battery cell 23 to be discharged and all battery cells to have the same cell voltage.

The disconnection detection circuit 9 is a circuit that detects a disconnection between the battery pack 2 and the charger 3. The disconnection detection circuit 9 is constituted of fixed current sources 91 to 95. Current sink nodes of the fixed current sources 91 to 95 are respectively connected to the connection terminals V1 to V5.

If there is a disconnection between the battery pack 2 and the charger 3, then the voltage of the corresponding connection terminal V1 to V5 is drawn down by the fixed current source 91 to 95. The determination circuit 11 determines the presence or absence of a disconnection according to the voltage of the intermediate connection points between the battery cells.

If there is a disconnection at the connection terminal C3, for example, then the fixed current source 93 causes the voltage of the connection terminal V3 to be drawn down. The determination circuit 11 determines the presence or absence of a disconnection in the connection terminal C3 according to the potential difference between the connection terminals V2 and V3.

Embodiment 3

(Charging System)

Figure 14:
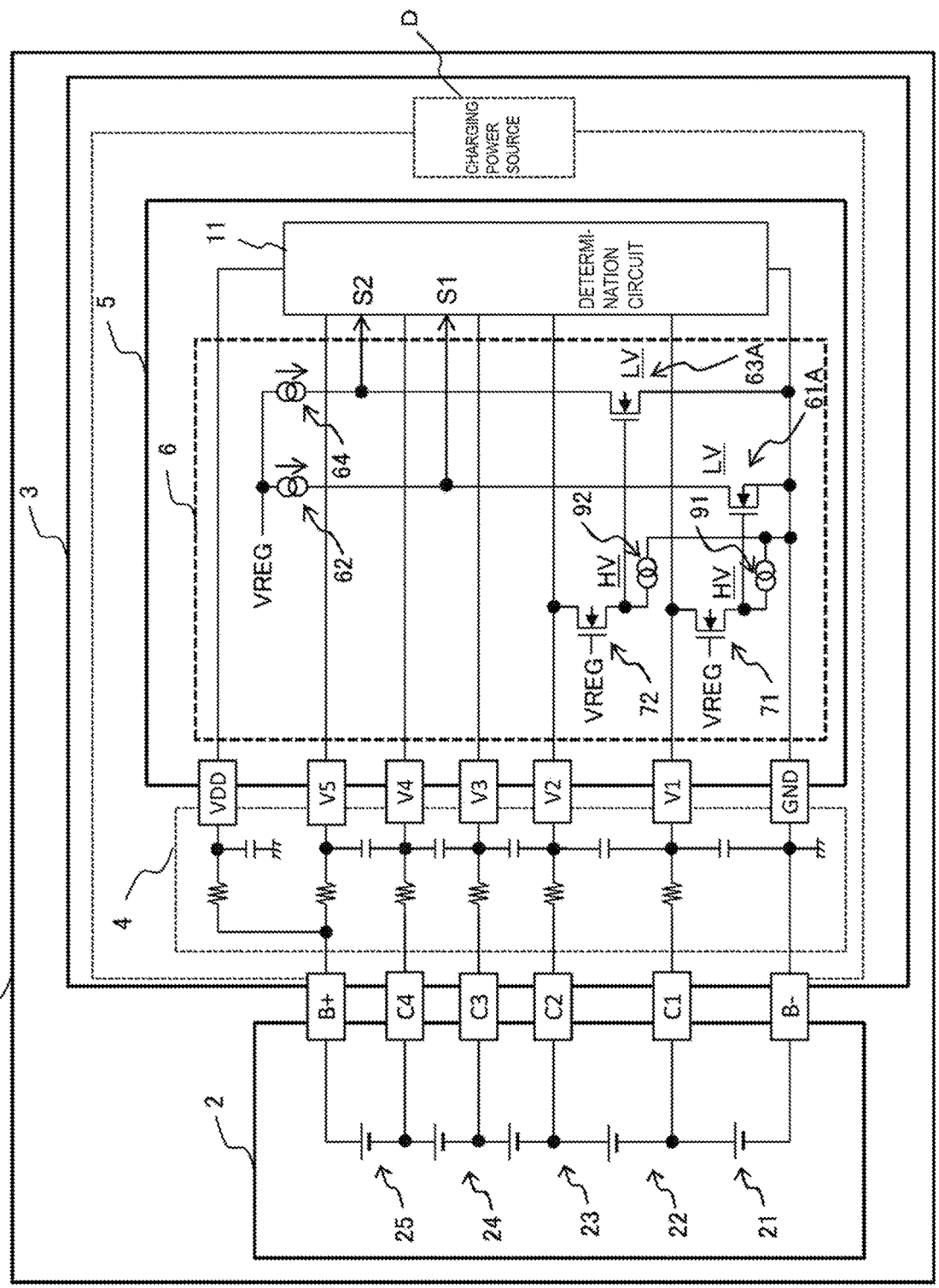
FIG. 14 is a block diagram showing an example of a configuration of a charging system according to Embodiment 3 of the present invention.

FIG. 14 is a block diagram showing an example of a configuration of a charging system according to Embodiment 3 of the present invention. A charging system of the present embodiment, similar to Embodiments 1 and 2, includes a battery pack 2 and a charger 3 that determines the cell count of the connected battery pack 2 and performs charging control according to the determined cell count. FIG. 14 shows an example in which a battery pack with five cells is connected to the charger 3.

In Embodiment 3, similar to Embodiment 2, a battery pack in which the remaining intermediate terminals are connected to the lowest-level terminal B– is used. In Embodiment 3, the configuration of the charger 3 differs from Embodiments 1 and 2. Below, the configuration of the charger 3 will be explained.

(Charger)

Similar to Embodiment 1, the charger 3 includes a noise filter 4, a battery monitoring IC 5, seven connection terminals (ground terminal GND, power source terminal VDD, and intermediate terminals V1 to V5) that connect the noise filter 4 to the battery monitoring IC 5, and a charging power source D. The battery monitoring IC 5 includes a cell detection circuit 6 and a determination circuit 11.

In Embodiment 3, the configuration of the cell detection circuit 6 of the charger 3 differs from Embodiments 1 and 2. The cell detection circuit 6 of Embodiment 3 includes NMOSs 61A and 63A for low voltage use (LV) as switch elements, fixed current sources 62 and 64, NMOSs 71 and 72 for high voltage use to protect against breakdown voltage, fixed current sources 91 and 92, and a regulator power source VREG. Details will be explained below.

Figure 15:
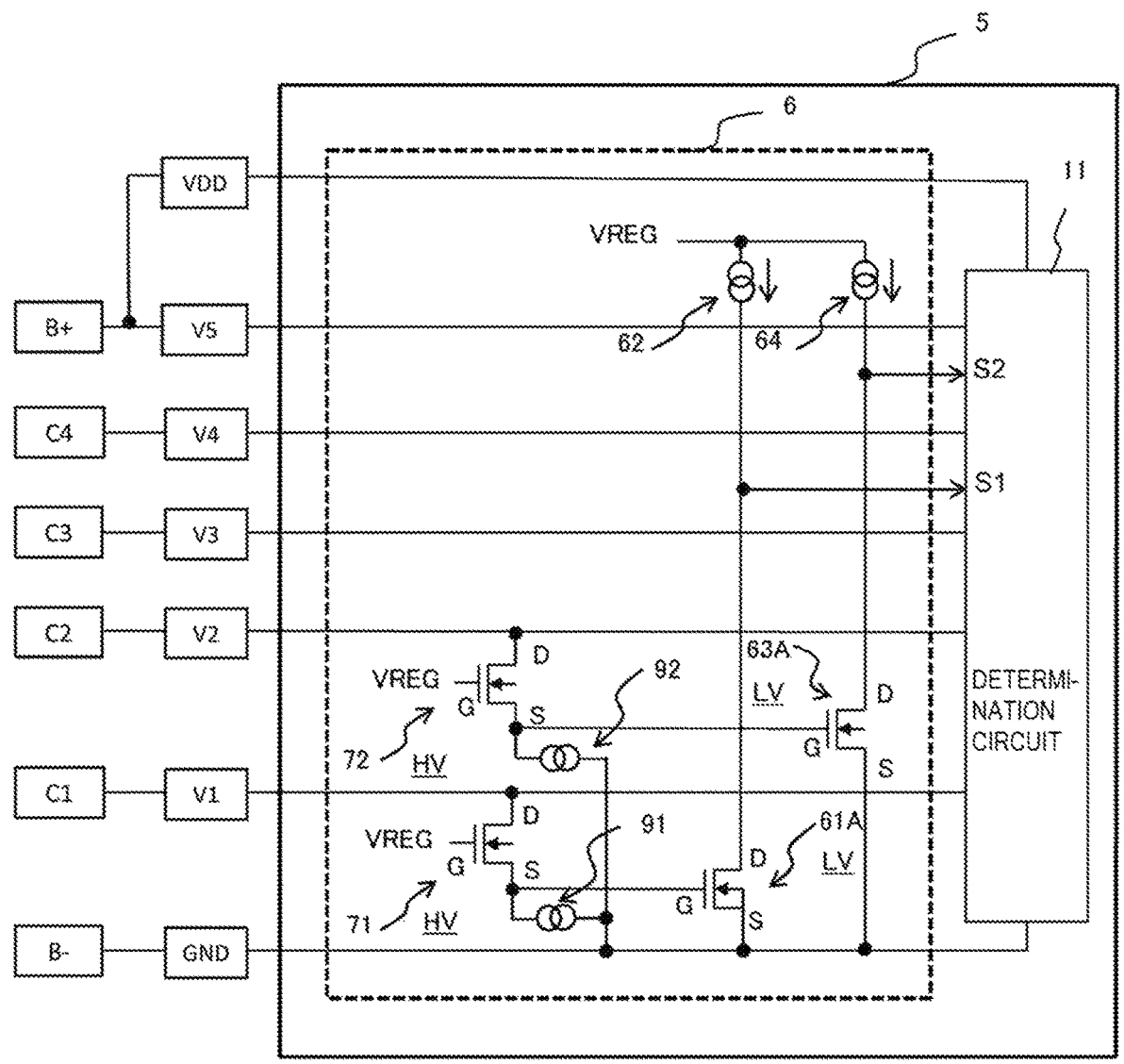
FIG. 15 is an enlarged view of a battery monitoring IC shown in FIG. 14.

FIG. 15 is an enlarged view of a battery monitoring IC 5 shown in FIG. 14. As shown in FIG. 15, the drain of the HV-NMOS 71 is connected to the connection terminal V1, the source is connected to the first end of the fixed current source 91, and the gate is connected to the regulator power source VREG. The second end of the fixed current source 91 is connected to the ground terminal GND.

The gate of the LV-NMOS 61A is connected to the connection point between the source of the HV-NMOS 71 and the fixed current source 91. The source of the LV-NMOS 61A is connected to the ground terminal GND and the drain is connected to the fixed current source 62. The second end of the fixed current source 62 is connected to the regulator power source VREG.

Also, the drain of the HV-NMOS 72 is connected to the connection terminal V2, the source is connected to the first end of the fixed current source 92, and the gate is connected to the regulator power source VREG. The second end of the fixed current source 92 is connected to the ground terminal GND.

The gate of the LV-NMOS 63A is connected to the connection point between the source of the HV-NMOS 72 and the fixed current source 92. The source of the LV-NMOS 63A is connected to the ground terminal GND and the drain is connected to the fixed current source 64. The second end of the fixed current source 64 is connected to the regulator power source VREG.

A voltage $V_{REG}$ of the regulator power source VREG may be 3V, for example.

An output S1 from the cell detection circuit 6 is the voltage of the connection point between the drain of the LV-NMOS 61A and the fixed current source 62. An output S2 from the cell detection circuit 6 is the voltage of the connection point between the drain of the LV-NMOS 63A and the fixed current source 64.

The determination circuit 11 converts the outputs S1 and S2 of the cell detection circuit 6 to an H level or an L level. Where an intermediate potential between $V_{GND}$ and $V_{REG}$ is set to be a threshold $V_S$ ($0 \approx V_{GND} < V_S < V_{REG}$), an output value $V_{GND}$ is at the "L level" and the output value $V_{REG}$ is at the "H level."

The determination circuit 11 uses the aforementioned cell count determination table (see FIG. 12) to determine the cell count of the battery pack 2 according to the values of the outputs S1 and S2 from the cell detection circuit 6.

(Operation of Battery Monitoring IC)

—Five-Cell Battery Pack—

First, a case in which a battery pack with five cells is connected will be described.

In FIG. 14, the gate is connected to the regulator power source VREG, and thus, the HV-NMOS 71 is turned ON. By turning ON the HV-NMOS 71, the gate voltage of the LV-NMOS 61A becomes high, resulting in the LV-NMOS 61A also being turned ON. When the LV-NMOS 61A turns ON, conduction is enabled between the source and the drain of the LV-NMOS 61A. As a result, the output S1 of the cell detection circuit 6 becomes substantially equal to the voltage $V_{GND}$, which is substantially equal to 0, of the ground terminal GND of the battery monitoring IC.

Here, the function of the HV-NMOS 71 for protection against breakdown voltage will be described. Even if the voltage of the connection terminal V1 connected to the drain exceeds $V_{REG}$, the gate voltage of the LV-NMOS 61A never exceeds $V_{REG}$. This is because, if the source voltage of the HV-NMOS 71 exceeds $V_{REG}$, then the HV-NMOS 71 is turned OFF, and the fixed current source 91 brings down the voltage. As a result, the LV-NMOS 61A can be set as a low voltage NMOS that turns ON/OFF with a voltage of 3V or less, for example.

Similarly, the gate is connected to the regulator power source VREG, and thus, the HV-NMOS 72 is turned ON. By turning ON the HV-NMOS 72, the gate voltage of the LV-NMOS 63A becomes high, resulting in the LV-NMOS 63A also being turned ON. When the LV-NMOS 63A turns ON, conduction is enabled between the source and the drain of the LV-NMOS 63A. As a result, the output S2 of the cell detection circuit 6 becomes substantially equal to the voltage $V_{GND}$, which is substantially equal to 0, of the ground terminal GND of the battery monitoring IC.

—Three-Cell Battery Pack—

Next, a case in which a battery pack with three cells is connected will be described.

Figure 16:
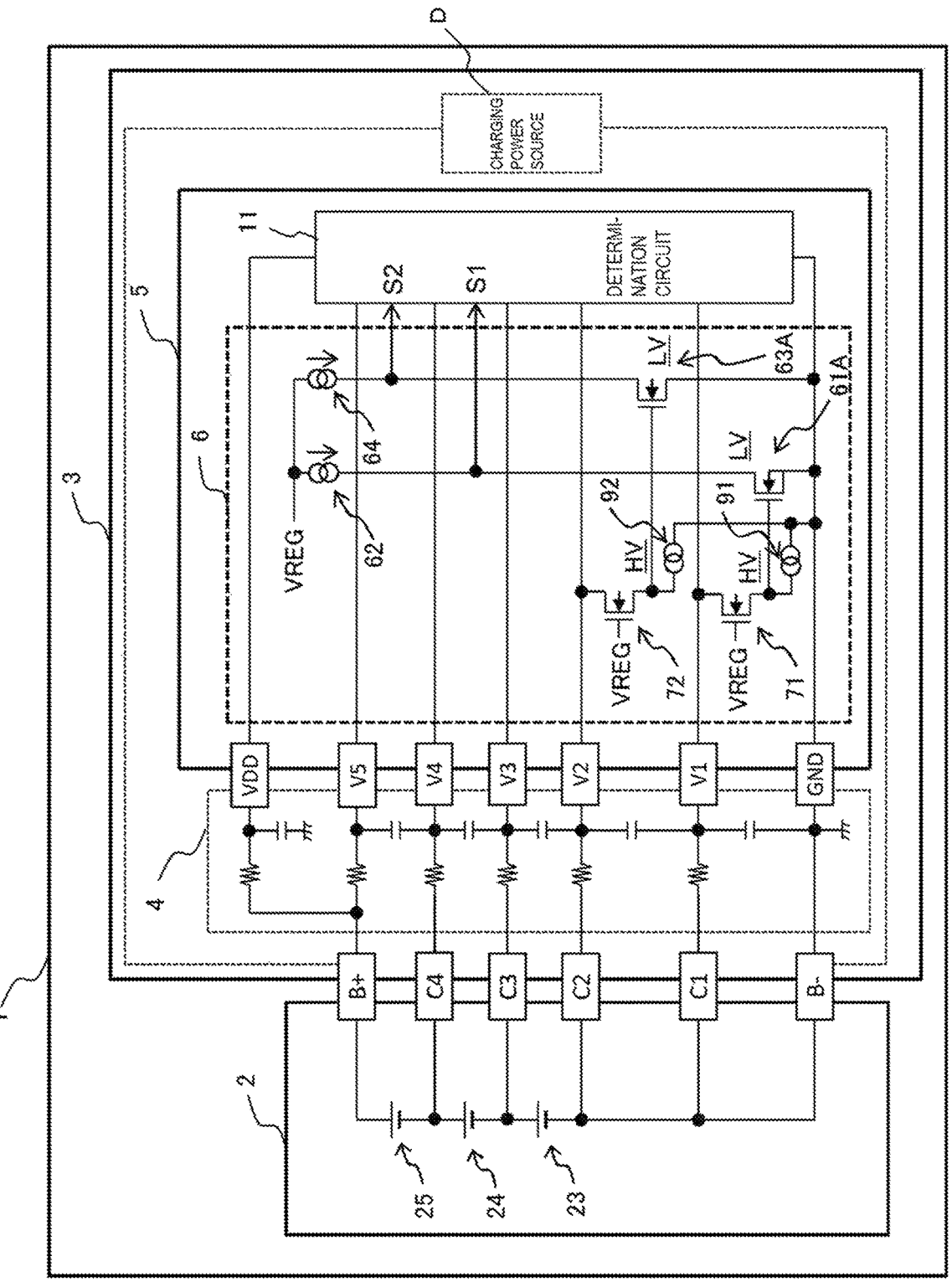
FIG. 16 is a block diagram showing an example in which a battery pack with three cells is connected to a charger.

FIG. 16 is a block diagram showing an example in which a battery pack with three cells is connected to a charger. In FIG. 16, the HV-NMOS 71 turns ON and conduction is enabled between the source and the drain of the HV-NMOS 71. The intermediate terminal C1 is connected to the lowest-level terminal B−, and thus, the gate-source voltage of the LV-NMOS 61A becomes substantially zero, resulting in the LV-NMOS 61A being turned OFF.

When the LV-NMOS 61A turns OFF, conduction is disabled between the source and the drain of the LV-NMOS 61A. As a result, the output S1 of the cell detection circuit 6 is brought up by the fixed current source 62, reaching the voltage $V_{REG}$ of the regulator power source VREG.

Similarly, the HV-NMOS 72 turns ON and conduction is enabled between the source and the drain of the HV-NMOS 72. The intermediate terminal C2 is connected to the lowest-level terminal B−, and thus, the gate-source voltage of the LV-NMOS 63A becomes substantially zero, resulting in the LV-NMOS 63A being turned OFF.

When the LV-NMOS 63A turns OFF, conduction is disabled between the source and the drain of the LV-NMOS 63A. As a result, the output S2 of the cell detection circuit 6 is brought up by the fixed current source 64, reaching the voltage $V_{REG}$ of the regulator power source VREG.

—Cell Count Determination Table—

Next, an operation for determining the cell count of the battery pack when the cell count is unknown will be described.

In simple terms, the cell detection circuit of the battery monitoring IC, which determines the cell count of the battery pack, is provided with NMOSs corresponding to battery cells that increase or decrease as the number of battery cells changes, and each NMOS is turned ON when there is a corresponding battery cell while being turned OFF if there is no corresponding battery cell.

The source of the NMOS is connected to the ground terminal GND and the drain is connected to the regulator power source VREG via the fixed current source 62. Thus, when the NMOS is ON, conduction is enabled between the source and drain, and the output of the cell detection circuit 6 reaches $V_{GND}$ (L level). When the NMOS is OFF, conduction is disabled between the source and drain, and the output of the cell detection circuit 6 reaches $V_{REG}$ (H level).

If the cell count can vary within a range of three to five, the battery cells that are included or not included depending on the number of battery cells are the two battery cells 21 and 22. In the present embodiment, the NMOS 61A corresponding to the battery cell 21 is provided and the NMOS 63A corresponding to the battery cell 22 is provided. If the battery cell 21 is present, then the NMOS 61A is ON and the output S1 reaches the L level. If the battery cell 22 is present, then the NMOS 63A is ON and the output S2 reaches the L level.

In other words, when the outputs S1 and S2 from the cell detection circuit 6 are both at the L level, then aside from the battery cells 23 to 25, the battery cells 21 and 22 are present, and thus, the cell count is determined to be five. When the output S1 is at the H level and the output S2 is at the L level, then aside from the battery cells 23 to 25, the battery 22 is present, and thus, the cell count is determined to be four. When the outputs S1 and S2 are both at the H level, then only the battery cells 23 to 25 are present, and thus, the cell count is determined to be three.

Effects of Embodiment 3

In Embodiment 3 as well, similar effects to Embodiment 2 can be attained.

Also, in Embodiment 3, the HV-NMOSs 71 and 72 for protection against breakdown voltage were added, and the gate voltage thereof was set to a given value (voltage $V_{REG}$ of the regulator power source VREG), and thus, it is possible to use the LV-NMOSs 61A and 63A as NMOSs for low voltage use. In general, the threshold of the NMOS for low voltage use is lower than the threshold of the NMOS for high voltage use, and even if the voltages of the battery cells 21 and 22 become low, it is possible to correctly detect the cell count. Also, low voltage elements can be used in the fixed current sources 62 and 64, and thus, the area taken up by the elements in the battery monitoring IC can be reduced.

Modification Example of Battery Monitoring IC

Figure 17:
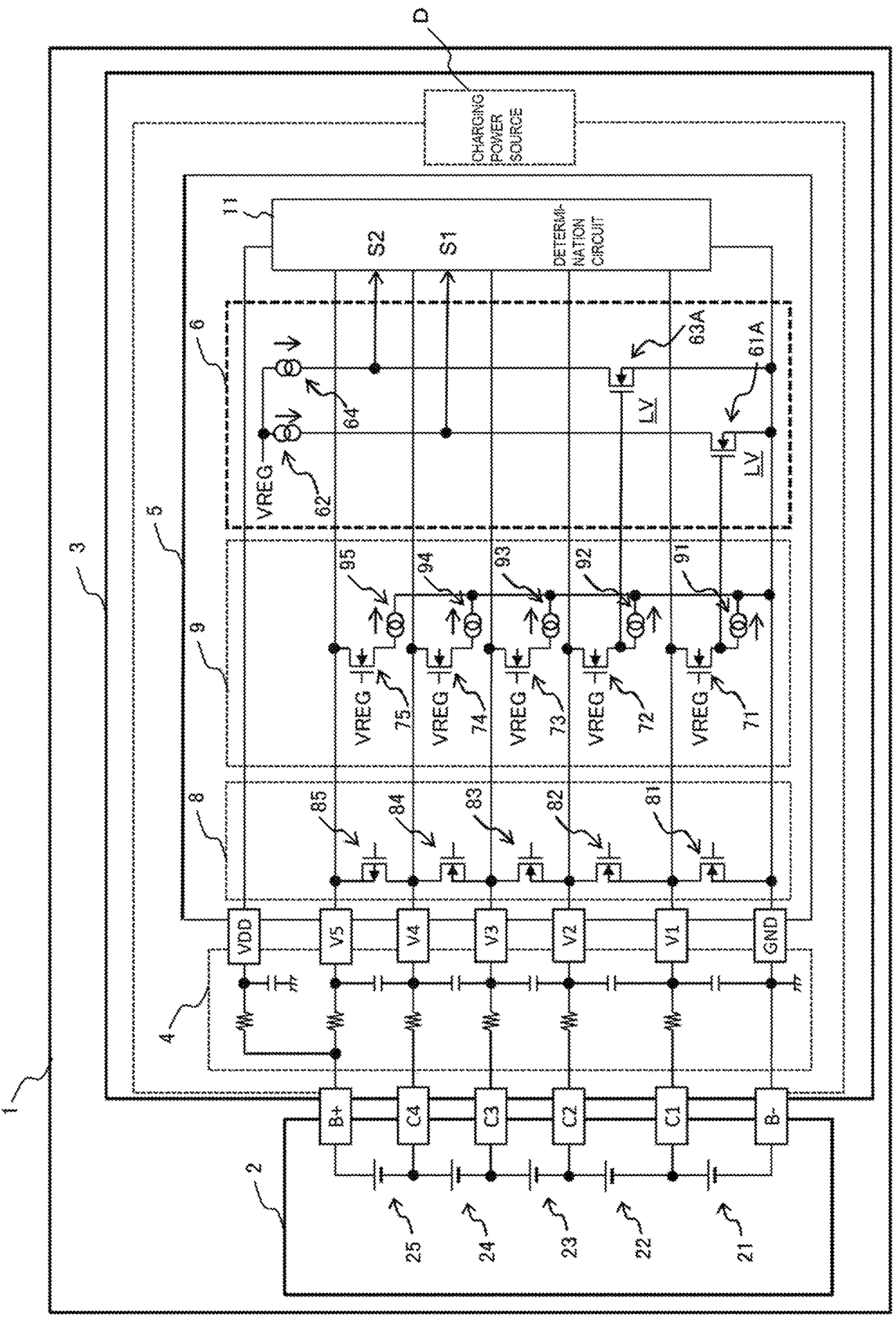
FIG. 17 is a block diagram showing an example of a configuration of a charging system according to a modification example of Embodiment 3.

FIG. 17 is a block diagram showing an example of a configuration of a charging system according to a modification example of Embodiment 3 of the present invention. The charging system according to the modification example differs from the configuration shown in FIG. 14 in that the battery monitoring IC 5 of the charger 3 additionally has a cell balance circuit 8 and a disconnection detection circuit 9. In the charging system according to the modification example, a battery monitoring IC equipped with a cell detection function, a cell balance function, and a disconnection detection function can be realized.

In the charging system of the modification example, the configuration of the cell detection circuit 6 of Embodiment 3 is divided into the disconnection detection circuit 9 and the cell detection circuit 6. A portion of the circuit can be shared between the disconnection detection circuit 9 and the cell detection circuit 6, and thus, the chip area of the battery monitoring IC can be reduced.

The disconnection detection circuit 9 is constituted of HV-NMOSs 71 to 75 for protection against breakdown voltage, and fixed current sources 91 to 95. Also, the drains of the HV-NMOSs 71 to 75 are respectively connected to the intermediate terminals V1 to V5, the sources are respectively connected to the fixed current sources 91 to 95, and the gates are connected to the regulator power source VREG. Current sink nodes of the fixed current sources 91 to 95 are respectively connected to the sources of the HV-NMOSs 71 to 75.

If there is a disconnection between the battery pack 2 and the charger 3, then the voltage of the corresponding intermediate terminal V1 to V5 is drawn down by the fixed current source 91 to 95. The determination circuit 11 determines the presence or absence of a disconnection according to the voltage of the intermediate connection points between the battery cells.

Other Modification Examples

The configurations of the cell count determination device, the charger, the battery pack, and the charging system described in the embodiments above are merely examples, and the configurations naturally may be modified within a scope that does not depart from the spirit of the present invention.

For example, in the embodiments, a charger including a cell count determination device was described, but the cell count determination device can be applied to other devices used by being connected to a battery pack.

As described in the embodiments, an example was described in which the maximum cell count for the battery pack is five, and the number of cells varies within a range of three to five, but the maximum cell count and the variation in cell count are not limited to this example.

A lithium-ion battery installed in an electric vehicle includes a plurality of modules that use a plurality of cells, and the cell count thereof can be determined by applying a similar configuration to that of the present invention, for example.

The LV-NMOSs of the cell detection circuit of Embodiment 3 may be replaced with NPN transistors.

Also, the fixed current sources of the cell detection circuits of Embodiments 1 to 3 may be replaced with resistors.

It is noted that the charger 3 can comprise the cell count determination device according to any of the embodiments disclosed herein, and the charging power source D can charge each of the battery cells of the battery pack according to the cell count determined by the cell count determination device. Further, the battery pack 2 can comprise a highest-level terminal connected to a highest-potential unit of the battery pack, a lowest-level terminal connected to a lowest-potential unit of the battery pack, and a plurality of intermediate terminals connected to any of a plurality of intermediate potential units having a potential of a connection point between battery cells installed in the battery pack, or connected to the highest-potential unit. In the battery pack 2, the plurality of intermediate terminals can correspond, respectively, to the plurality of intermediate potential units of the battery pack having a maximum cell count. If the cell count of the installed battery cells is not at a maximum, remaining intermediate terminals can be connected to the highest-potential unit. Further, the charging system 1 can comprise the battery pack according to any of the embodiments disclosed herein, and the cell count determination device according to any of the embodiments disclosed herein.

What is claimed is:

1. A cell count determination device that is configured to determine a cell count of a battery pack having installed therein a plurality of battery cells, the cell count determination device comprising:
   a plurality of switch elements provided in association with the plurality of battery cells, the plurality of battery cells being variable in number in the battery pack, each of the plurality of switch elements being configured to enter a conductive state if a corresponding battery cell is present, and enter a non-conductive state if the corresponding battery cell is not present; and
   a determination unit that is configured to determine the cell count of the plurality of battery cells present in the battery pack based on a combination of conductive states and non-conductive states among the plurality of switch elements.

2. A cell count determination device that is configured to determine a cell count of a battery pack having installed therein a plurality of battery cells, the cell count determination device comprising:
   a plurality of switch elements, each of which includes a first terminal, a second terminal, and a third terminal; and
   a determination unit that is configured to determine the cell count of the battery pack based on a combination of potentials of the second terminals of the plurality of switch elements,
   wherein, in each of the plurality of switch elements,
   the first terminal is connected to a highest-potential unit having a highest potential in the battery pack,
   the second terminal is connected to a lowest-potential unit having a lowest potential in the battery pack,
   the third terminal is connected to any of a plurality of intermediate-potential units having a potential of a connection point between battery cells installed in the battery pack, or is connected to the highest-potential unit, and
   a conductive state between the first terminal and the second terminal is determined based on a voltage difference between the first terminal and the third terminal.

3. The cell count determination device according to claim 2,
   wherein each of the plurality of switch elements is a p-type metal oxide semiconductor (PMOS) transistor including as a source the first terminal, as a drain the second terminal, and as a gate the third terminal,
   wherein, if the third terminal is connected to any of the plurality of intermediate-potential units, a switch element enters the conductive state, and the potential of the second terminal reaches the highest potential, and
   wherein, if the third terminal is connected to the highest-potential unit, the switch element enters a non-conductive state, and the potential of the second terminal reaches the lowest potential.

4. A cell count determination device that is configured to determine a cell count of a battery pack having installed therein a plurality of battery cells, the cell count determination device comprising:
   a plurality of switch elements, each of which includes a first terminal, a second terminal, and a third terminal; and
   a determination unit that is configured to determine the cell count of the battery pack based on a combination of potentials of the second terminals of the plurality of switch elements,
   wherein, in each of the plurality of switch elements,
   the first terminal is connected to a lowest-potential unit having a lowest potential in the battery pack,
   the second terminal is connected to a highest-potential unit having a highest potential in the battery pack, or is connected to a fixed potential unit having a predetermined potential,
   the third terminal is connected to any of a plurality of intermediate-potential units having a potential of a connection point between battery cells installed in the battery pack, or is connected to the lowest-potential unit, and
   a conductive state between the first terminal and the second terminal is determined based on a voltage difference between the first terminal and the third terminal.

5. The cell count determination device according to claim 4,
   wherein each of the plurality of switch elements is an n-type metal oxide semiconductor (NMOS) transistor including as a source the first terminal, as a drain the second terminal, and as a gate the third terminal,
   wherein, if the third terminal is connected to any of the plurality of intermediate-potential units, a switch element enters the conductive state, and the potential of the second terminal reaches the lowest potential, and
   wherein, if the third terminal is connected to the lowest-potential unit, the switch element enters a non-conductive state, and the potential of the second terminal reaches the highest potential or the predetermined potential.

6. The cell count determination device according to claim 4,
wherein each of the plurality of switch elements is an NMOS transistor for low voltage use, and
in each of the plurality of switch elements, the third terminal is connected to any of the plurality of intermediate-potential units via an NMOS transistor for high voltage use, or is connected to the lowest-potential unit.

* * * * *